United States Patent [19]

Majid et al.

[11] Patent Number: 5,874,841

[45] Date of Patent: Feb. 23, 1999

[54] SAMPLE-AND-HOLD CIRCUIT FOR A SWITCHED-MODE POWER SUPPLY

[75] Inventors: Naveed Majid, Mohegan Lake, N.Y.; Ton Mobers, Grave; Erwin Seinen, Malden, both of Netherlands

[73] Assignee: Philips Electronics North America Corporation, New York, N.Y.

[21] Appl. No.: 901,491

[22] Filed: Jul. 28, 1997

[51] Int. Cl.[6] .................................................. G11C 27/02
[52] U.S. Cl. ................................. 327/94; 327/95; 327/96
[58] Field of Search .................................. 327/91, 92, 93, 327/94, 95, 96, 97, 110, 143, 198; 341/122; 363/21, 41

[56] References Cited

U.S. PATENT DOCUMENTS

| | | | |
|---|---|---|---|
| 4,004,190 | 1/1977 | Simpson | 315/403 |
| 5,453,921 | 9/1995 | Shutts | 363/21 |
| 5,498,995 | 3/1996 | Szepesi et al. | 327/538 |
| 5,650,715 | 7/1997 | Massie | 323/273 |

*Primary Examiner*—My-Trang Nu Ton
*Attorney, Agent, or Firm*—Steven R. Biren

[57] ABSTRACT

A sample-and-hold circuit is provided for a switched-mode power supply of the type having a transformer with a primary winding, an auxiliary winding and a secondary winding, with a switching transistor coupled in series with the primary winding and a sample-and-hold capacitor for storing a voltage proportional to an output voltage of the auxiliary winding and coupled to a controlled terminal of the switching transistor in a feedback loop which normally operates in a closed-loop mode for switchably regulating the power supply. To prevent the feedback loop from being driven to an open-loop or "stuck" mode of operation, a discharge capacitor is provided which is switchably coupled in parallel with the sample-and-hold capacitor to discharge excess voltage from the sample-and-hold capacitor and thereby restore the feedback loop to its normal closed-loop operating mode.

5 Claims, 2 Drawing Sheets

SAMPLE-AND-HOLD CIRCUIT FOR A SWITCHED-MODE POWER SUPPLY

BACKGROUND OF THE INVENTION

The invention is in the field of power supply regulation circuits, and relates more particularly to an improved sample-and-hold circuit for a switched-mode power supply.

Switched-mode power supplies are well known in the art, and are typically used to obtain good regulation (due to switched feedback) as well as efficient and economical filtering, since smaller-value filtering components can be used because of the typically high operating frequency of the switched-mode supply.

One technique used for obtaining good regulation in switched-mode power supplies is to employ a sample-and-hold circuit in a closed-loop feedback mode. One such circuit is disclosed in European Patent Application No. 97200855.1, filed on Mar. 21, 1997, corresponding to U.S. patent application Ser. No. 08/927,831 filed on Sep. 11, 1997 and to be incorporated herein by reference in its entirety. It is noted that the foregoing is not deemed to be prior art, but is discussed herein as background in that the present invention provides an improvement thereover. In this sample-and-hold circuit, the voltage on a primary auxiliary winding, which is a representation of the output voltage, is sampled, and the sampled voltage is stored in an off-chip sample-and-hold capacitor. The sampled voltage is used to set the duty cycle of operation for a switching transistor coupled in series with a primary transformer winding by providing a pulse-width modulated signal to the switching transistor.

This type of sample-and-hold regulation scheme provides excellent regulation, but suffers from the serious drawback that at or above a certain voltage level on the capacitor, the duty cycle of the pulse-width-modulation signal can drop to zero and the system can go out of regulation, with the feedback loop open. Such a "stuck" state can occur, for example, if the output voltage of the system rises well beyond its nominal value, such as may occur at startup or during a voltage spike or fault condition.

Once such a condition occurs, the duty cycle of the pulse-width-modulation signal will be driven to zero and no switching regulation will occur. This "stuck" state will continue until the sample-and-hold capacitor discharges to a sufficiently low voltage such that the duty cycle of the pulse-width-modulation signal is greater than zero, whereupon the system will revert to its normal closed-loop feedback mode of operation. Thus, under certain conditions, the foregoing sample-and-hold regulation scheme may effectively become disabled for an indeterminate and possibly an unsatisfactorily long period of time.

Accordingly, it would be desirable to have a sample-and-hold circuit for a switched-mode power supply in which a "stuck" or open-loop mode of operation can be detected, and in which the normal closed-loop feedback mode of operation can be efficiently restored in a controlled and timely manner.

SUMMARY OF THE INVENTION

It is therefore an object of the invention to provide a sample-and-hold circuit for a switched-mode power supply which is capable of detecting a "stuck" or open-loop mode of operation and restoring the circuit to its normal closed-loop feedback mode in an efficient and timely manner.

In accordance with the invention, these objects are achieved by a new sample-and-hold circuit for a switched-mode power supply in which a discharge capacitor is switchably coupled in parallel with the sample-and-hold capacitor for discharging excess charge (that may drive the feedback loop into an open-loop mode of operation) from the sample-and-hold capacitor to restore the feedback loop to its normal closed-loop mode of operation. In a preferred embodiment of the invention, discharging means are provided for periodically discharging the discharge capacitor. Preferably, this discharging function can be performed by switching means coupled in parallel with the discharge capacitor and controlled by a square-wave output of an oscillator.

In a further preferred embodiment of the invention, the switching transistor is pulse-width-modulated by a PWM comparator having a first input coupled to the sample-and-hold capacitor, a second input coupled to a sawtooth waveform output of the oscillator, and an output coupled to the control terminal of the switching transistor to provide a pulse-width-modulated control signal thereto.

In yet a further preferred embodiment of the invention, a switch is coupled in series with the discharge capacitor to switchably couple the discharge capacitor in parallel with the sample-and-hold capacitor, with the switch being controlled by a square-wave output of the oscillator and an output of a latch circuit having a first input coupled to the square-wave output of the oscillator and a second input coupled to the output of the PWM comparator.

A sample-and-hold circuit in accordance with the present invention offers a significant improvement in that a faster, more efficient and more precisely controlled recovery from a "stuck" or open-loop mode of operation is provided for a switched-mode power supply in which the circuit of the invention is incorporated.

These and other aspects of the invention will be apparent from and elucidated with reference to the embodiments described hereinafter.

BRIEF DESCRIPTION OF THE DRAWING

The invention may be more completely understood with reference to the following description, to be read in conjunction with the accompanying drawing, in which.

DESCRIPTION OF THE PREFERRED EMBODIMENTS

Figure 1:
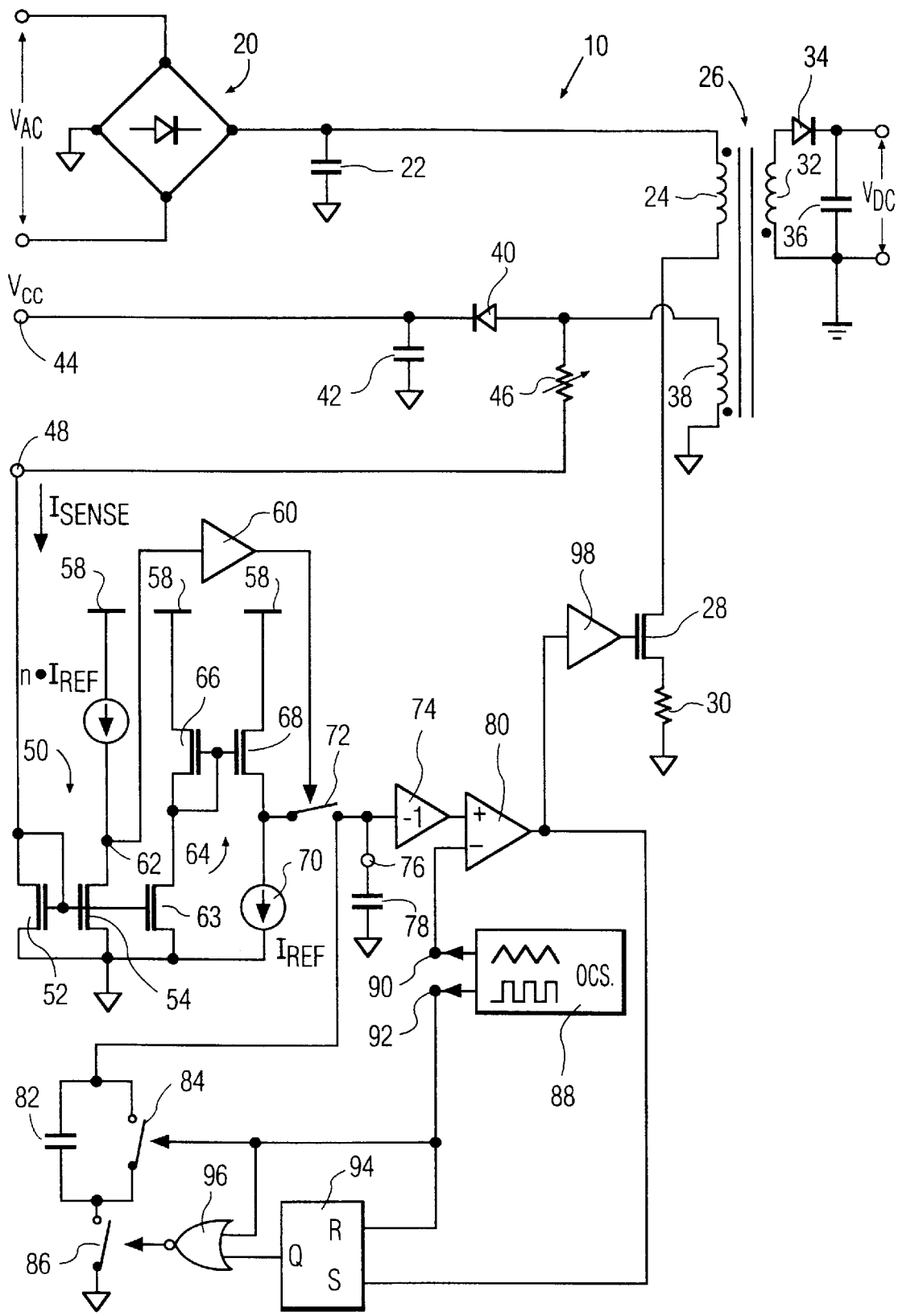
FIG. 1 shows a simplified schematic diagram of a switched-mode power supply incorporating a sample-and-hold circuit in accordance with the invention.

A simplified schematic of a switched-mode power supply 10 having an overvoltage protection circuit in accordance with the invention is shown in FIG. 1. In the circuit shown, an AC input voltage $V_{AC}$ is applied to a conventional diode bridge rectifier 20, the output of which is coupled to a filter capacitor 22 and a primary winding 24 of a transformer 26. The primary winding 24 is coupled to ground through a switching transistor 28 and, optionally, a resistor 30. A secondary winding 32 of transformer 26 has its output coupled through a diode 34 to a filter capacitor 36, with the D.C. output voltage $V_{DC}$ of the circuit being taken across this capacitor. An auxiliary winding 38 of the transformer 26 is connected to a diode 40 and a filter capacitor 42 to generate a D.C. voltage $V_{CC}$ on terminal 44, which voltage can be used to power the control circuitry of the power supply.

A sensing resistor 46, here a variable resistor, is coupled directly from the auxiliary winding 38 of the transformer 26 to an input terminal 48 of a current mirror 50 in order to provide an input current $I_{SENSE}$ proportional to the auxiliary winding output voltage to the input terminal 48 of the current mirror 50. The current mirror 50 includes two MOSFET transistors 52 and 54 in a conventional current mirror configuration.

The output of current mirror 50 is connected to a current source 56, which is coupled to a power line 58 and which provides a current of $n \cdot I_{REF}$. A current comparator 60 has an input coupled to a junction 62 between current source 56 and current-mirror transistor 54, so that the current comparator changes state when the current in current mirror transistor 54 exceeds the value $n \cdot I_{REF}$ of the current source 56. In a preferred embodiment of the invention, the value of n will be equal to 0.93, although it will be recognized that this is merely an illustrative example, and that other values may be selected.

The current $I_{SENSE}$ is also mirrored, through MOSFET transistors 52 and 63, to a current mirror 64 composed of MOSFET transistors 66 and 68. The output of current mirror 64 is coupled to ground through $I_{REF}$ current source 70, with the junction between transistor 68 and current source 70 being connected to a switch 72 which is controlled by the output of current comparator 60.

The output of switch 72 is coupled to an analog inverting (–1) amplifier 74 and, through terminal 76, to an off-chip sample-and-hold capacitor 78, which may typically have a value of between 500 pf and 2 nf, although it will be apparent that values outside this range are also within the scope of the invention. The output of amplifier 74 is coupled to a noninverting input of a PWM comparator 80 in order to provide the comparator with an inverted version of the signal on sample-and-hold capacitor 78.

In accordance with the invention, the output of switch 72 is also coupled to one side of a discharge capacitor 82 and one side of a switch 84 which is connected in parallel with the discharge capacitor, with the parallel-connected combination of discharge capacitor 82 and switch 84 being switchably coupled to ground through a switch 86. Discharge capacitor 82 may typically have a value of about 2 pf, but other values are clearly within the scope of the present invention.

Timing signals for the circuit are provided by an oscillator 88, which is a free-running oscillator which provides both a sawtooth waveform, at terminal 90, which is connected to the inverting input of PWM comparator 80, and a square-wave output, at terminal 92, which is provided to both the switch 84 and the Reset (R) input of a latch 94. The characteristics of the oscillator outputs will be described hereinafter, in connection with a description of the operation of the circuit.

Latch 94, which is a reset dominant latch (i.e., inputs on both the Set (S) and Reset (R) terminals will produce a low signal at output terminal Q), has its Set input coupled to the output of PWM comparator 80, and has its output terminal Q coupled to one input of a NOR gate 96. A second input of NOR gate 96 is coupled to the square-wave output 92 of oscillator 88, and the output of NOR gate 96 controls the operation of switch 86. The circuit configuration is completed by coupling the output of PWM comparator 80 to the control electrode (here the gate) of switching transistor 28, in this example through a driver 98.

As noted above, one technique used for obtaining good regulation in switched-mode power supplies is to employ a sample-and-hold circuit in a closed-loop feedback mode. In the circuit of FIG. 1, this feedback loop includes sensing resistor 46, which senses the voltage at auxiliary winding 38 and provides a current to current mirrors 50 and 64, with the latter current mirror being switchably connected to sample-and-hold capacitor 78. In this manner current will be driven into, or sunk out of, capacitor 78 as a function of the relative values of the current out of current mirror 64 and $I_{REF}$. The voltage on capacitor 78 is used to generate a signal which ultimately sets the duty cycle of switching transistor 28, connected in series with primary winding 24, thus controlling the switching cycle of the power supply in a closed-loop manner.

The drawback of such a circuit, as so far described, is that if the voltage level on capacitor 78 rises above a certain voltage level, the duty cycle of the pulse-width modulated signal provided to transistor 28 can drop to zero and the system can go out of regulation, with the feedback loop open. Such a "stuck" state can occur, for example, if the output voltage of the system rises well beyond its nominal value, a condition which may occur at startup or during a fault condition. Once such a condition occurs, no switching regulation will take place, and the "stuck" state will continue for an indefinite time, until the sample-and-hold capacitor discharges to a sufficiently low voltage to return the system to its normal closed-loop operating mode. In the typical case, this may take an undesirably long period of time, typically in the range of several milliseconds or more.

In order to overcome this deficiency, the present invention provides means for detecting a "stuck" or open-loop mode of operation and for restoring the circuit to its normal closed-loop feedback mode in a timely and efficient manner. This is accomplished by switchably coupling a discharge capacitor in parallel with the sample-and-hold capacitor to reduce the voltage on the latter and restore the system to its normal closed-loop mode of operation. Available on-chip voltages are used to control the switchable connection of the discharge capacitor 82 across the sample-and-hold capacitor 78, in a manner to be described below with reference to the waveforms of FIGS. 2A–2F.

Figure 2A:
FIGS. 2A–2F show timing diagrams of selected waveforms with reference to the schematic diagram of FIG. 1.
Figure 2B:
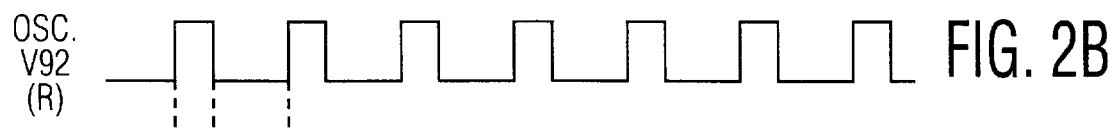

FIGS. 2A and 2B show the two outputs 90 and 92 of oscillator 88. This free-running oscillator, which can either be a fixed-frequency oscillator or a variable frequency oscillator, typically in the range of about 50 to 90 kHz, provides both a sawtooth waveform output, here having asymmetrical waveform with an 80% rise time and 20% fall time (see FIG. 2A) and a square-wave output having a pulse width corresponding to the fall time of the sawtooth waveform (see FIG. 2B).

The voltage on sample-and-hold capacitor 78 is coupled to analog inverting amplifier 74, the output of which is provided to the noninverting input of PWM comparator 80. The inverting input of PWM comparator 80 is coupled to the sawtooth waveform output of oscillator 88, with the resulting output of PWM comparator being shown in FIG. 2C.

Figure 2C:
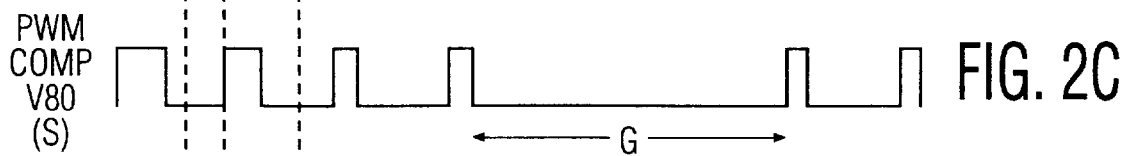

As the system voltage rises, the voltage on capacitor 78 will also rise, thus resulting in a falling voltage at the output of inverting amplifier 74, which feeds the noninverting input of PWM comparator 80. This will result in a decreasing pulse width at the output of PWM comparator 80, as shown in FIG. 2C, and, if the voltage at capacitor 78 rises sufficiently high, will result in a time period G in which the comparator no longer generates pulses, thus driving the system into an open-loop mode of operation.

The circuit of the present invention senses this condition by providing the output of comparator 80 to the Set (S) input of latch 94, while the Reset (R) input of latch 94 is coupled to the continuously-running square-wave output 92 (FIG.

Figure 2D:
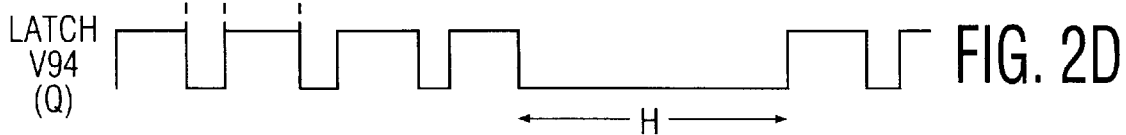
Figure 2E:
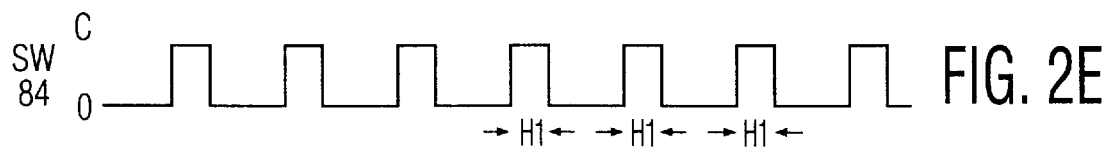
Figure 2F:
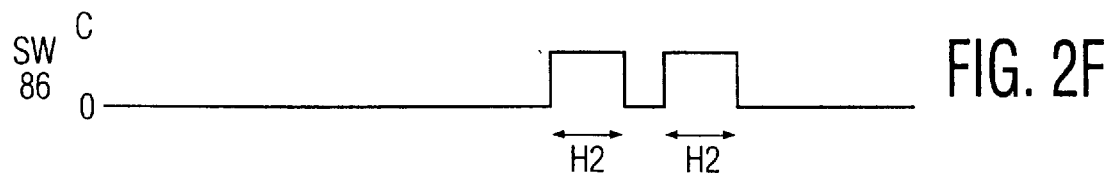

2B) of oscillator 88. The resulting Q output of latch 94, shown in FIG. 2D, thus has a time period H in which the waveform remains low. The square-wave oscillator output 92 (FIG. 2B) and the Q output from latch 94 are provided to NOR gate 96, to produce a waveform to control the opening (O) and closing (C) of switch 86, as shown in FIG. 2F. Additionally, the square-wave output 92 of the oscillator directly controls the opening and closing of switch 84, as shown in FIG. 2E.

Together, the switches 86 and 84, respectively, control the timing of the connection of discharge capacitor 82 across sample-and-hold capacitor 78, and the subsequent discharging of discharge capacitor 82.

Since switches 84 and 86 are connected in series between terminal 76 and ground, it would be undesirable to have both switches closed at the same time, since this would create a short to ground across capacitor 78. Accordingly, the time period H of FIG. 2D is divided into a number of sub-periods $H_1$, as shown in FIG. 2E, when switch 84 is closed, and a number of time periods $H_2$, which are collectively mutually exclusive with the periods $H_1$, as shown in FIG. 2F, when switch 86 is closed. Thus, at the start of time period H, switch 84 is closed for the interval $H_1$ to discharge capacitor 82, whereafter switch 84 is opened and switch 86 is closed for the duration $H_2$ to connect the discharge capacitor in parallel with the sample-and-hold capacitor. Capacitor 82 is then discharged, during a second time period $H_1$, and the cycle repeats for the duration of time period H, until such time as the voltage on capacitor 78 is sufficiently lowered, in a controlled manner, to permit the voltage on the noninverting input of PWM comparator 80 to rise to the point where the comparator reverts to a switching mode, as shown at the end of time interval G in FIG. 2C, thus restoring the system to its normal closed-loop mode of operation. It will be understood that the duration of the time periods G and H will depend, inter alia, on the relative values of capacitors 78 and 82, the amount of overvoltage on capacitor 78 at the initiation of the charge draining process, and the like.

In this manner, the present invention provides a sample-and-hold circuit in which excess voltage on the sample-and-hold capacitor can be removed by a discharge capacitor in an efficient and effective manner, to restore the circuit to its desired close-loop feedback mode of operation.

While the invention has been particularly shown and described with reference to several preferred embodiments thereof, it will be understood by those skilled in the art that various changes in form and detail may be made without departing from the spirit or scope of the invention.

What is claimed is:

1. A sample-and-hold circuit for a switched-mode power supply having a transformer with a primary winding, an auxiliary winding and a secondary winding, a switching transistor coupled in series with the primary winding, and a sample-and-hold capacitor for storing a voltage proportional to an output voltage of said auxiliary winding and coupled to a control terminal of said switching transistor in a feedback loop which normally operates in a closed-loop mode for switchably regulating said switched-mode power supply, characterized in that said circuit comprises a discharge capacitor switchably coupled in parallel with said sample-and-hold capacitor for discharging excess voltage that will drive said feedback loop into an open-loop mode of operation from said sample-and-hold capacitor to restore said feedback loop to said closed-loop mode of operation.

2. A sample-and-hold circuit for the switched-mode power supply as in claim 1, characterized in that discharging means is provided for periodically discharging said discharge capacitor.

3. A sample-and-hold circuit for the switched-mode power supply as in claim 2, characterized in that said discharging means comprises first switching means coupled in parallel with said discharge capacitor and controlled by a square-wave output of an oscillator.

4. A sample-and-hold circuit for the switched-mode power supply as in claim 3, characterized in that a PWM comparator is provided having a first input coupled to said sample-and-hold capacitor, a second input coupled to a sawtooth waveform output of said oscillator, and an output coupled to said control terminal of said switching transistor.

5. A sample-and-hold circuit for the switched-mode power supply as in claim 4, characterized in that means for switchably coupling said discharge capacitor are provided comprising second switching means coupled in series with said discharge capacitor and controlled by said square-wave output of said oscillator and an output of a latch circuit having a first input coupled to said square-wave output of said oscillator and a second input coupled to the output of said PWM comparator.

\* \* \* \* \*